United States Patent [19]
Iriguchi et al.

[11] Patent Number: 6,047,225
[45] Date of Patent: Apr. 4, 2000

[54] AUTOMATIC PROGRAMMING APPARATUS AND METHOD

[75] Inventors: Kenji Iriguchi; Kiyotaka Kato; Susumu Matsubara, all of Tokyo, Japan

[73] Assignee: Mitsubishi Denki Kabushiki Kaisha, Tokyo, Japan

[21] Appl. No.: 09/007,792

[22] Filed: Jan. 15, 1998

[30] Foreign Application Priority Data

Jan. 17, 1997 [JP] Japan .................................... 9-006655

[51] Int. Cl.$^7$ ............................ G06F 19/00; G06F 17/50; G06F 7/66
[52] U.S. Cl. .......................... 700/187; 700/172; 700/160; 700/186; 700/191; 700/86; 700/30
[58] Field of Search .................................... 700/172, 160, 700/186, 187, 191, 86; 70/30

[56] References Cited

U.S. PATENT DOCUMENTS

| | | | |
|---|---|---|---|
| 3,632,989 | 1/1972 | Kasischke | 235/432 |
| 4,181,954 | 1/1980 | Rosenthal et al. | 358/1.3 |
| 4,315,315 | 2/1982 | Kossiakoff | 395/701 |
| 4,636,938 | 1/1987 | Broome | 700/86 |
| 5,019,993 | 5/1991 | Montalcini et al. | 700/187 |
| 5,173,648 | 12/1992 | Kawamura et al. | 318/568.13 |
| 5,282,143 | 1/1994 | Shirai et al. | 700/187 |
| 5,351,196 | 9/1994 | Sowar et al. | 364/474.24 |
| 5,471,406 | 11/1995 | Breyer et al. | 702/168 |

*Primary Examiner*—Paul P. Gordon
*Assistant Examiner*—Ivan Calcaño
*Attorney, Agent, or Firm*—Leydig, Voit & Mayer, Ltd.

[57] ABSTRACT

An automatic programming apparatus comprises a machining unit preparing section for preparing plural machining units, a machining unit defining section for selecting a designated machining unit from the prepared machining units and designating the arrangement and size of the machining area of the selected machining unit, and an machined material creating section for creating a shape with the machining area shape removed from the material shape. The automatic programming apparatus and method for an NC machine which can easily create a machining program in complicated machining and also create a correct program quickly in complicated machining by trial and error.

5 Claims, 15 Drawing Sheets

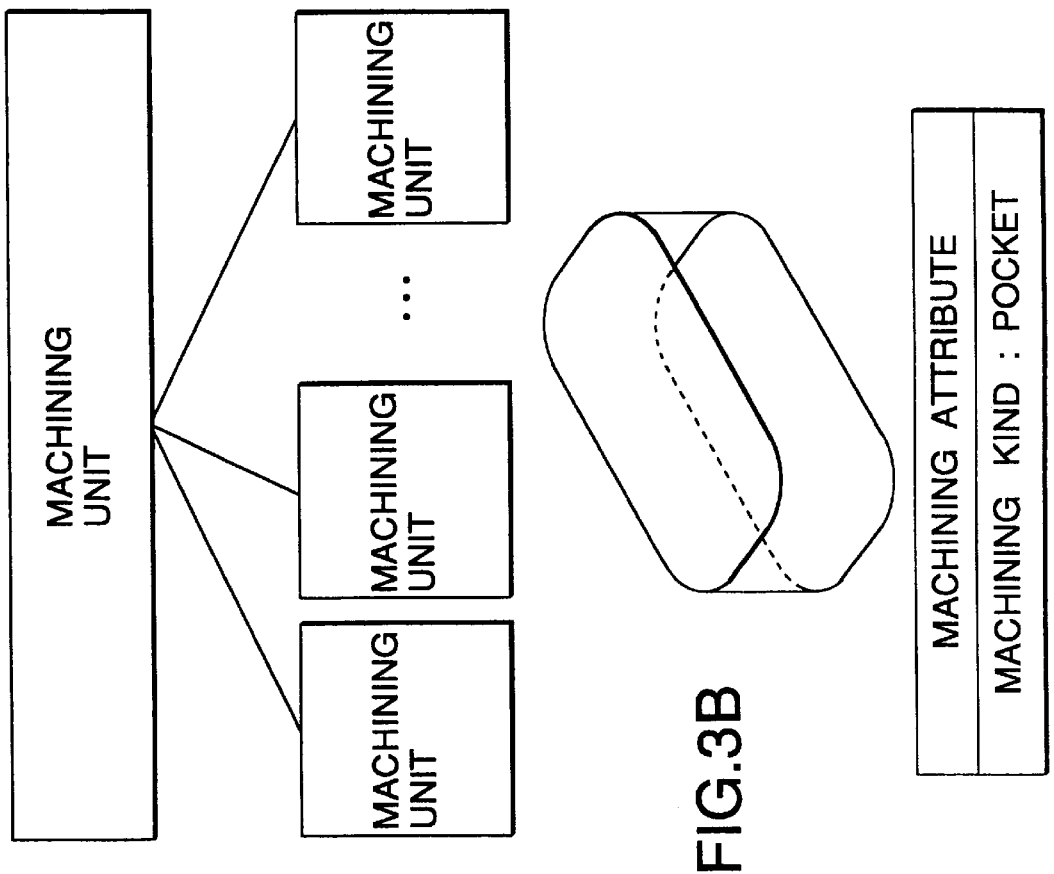

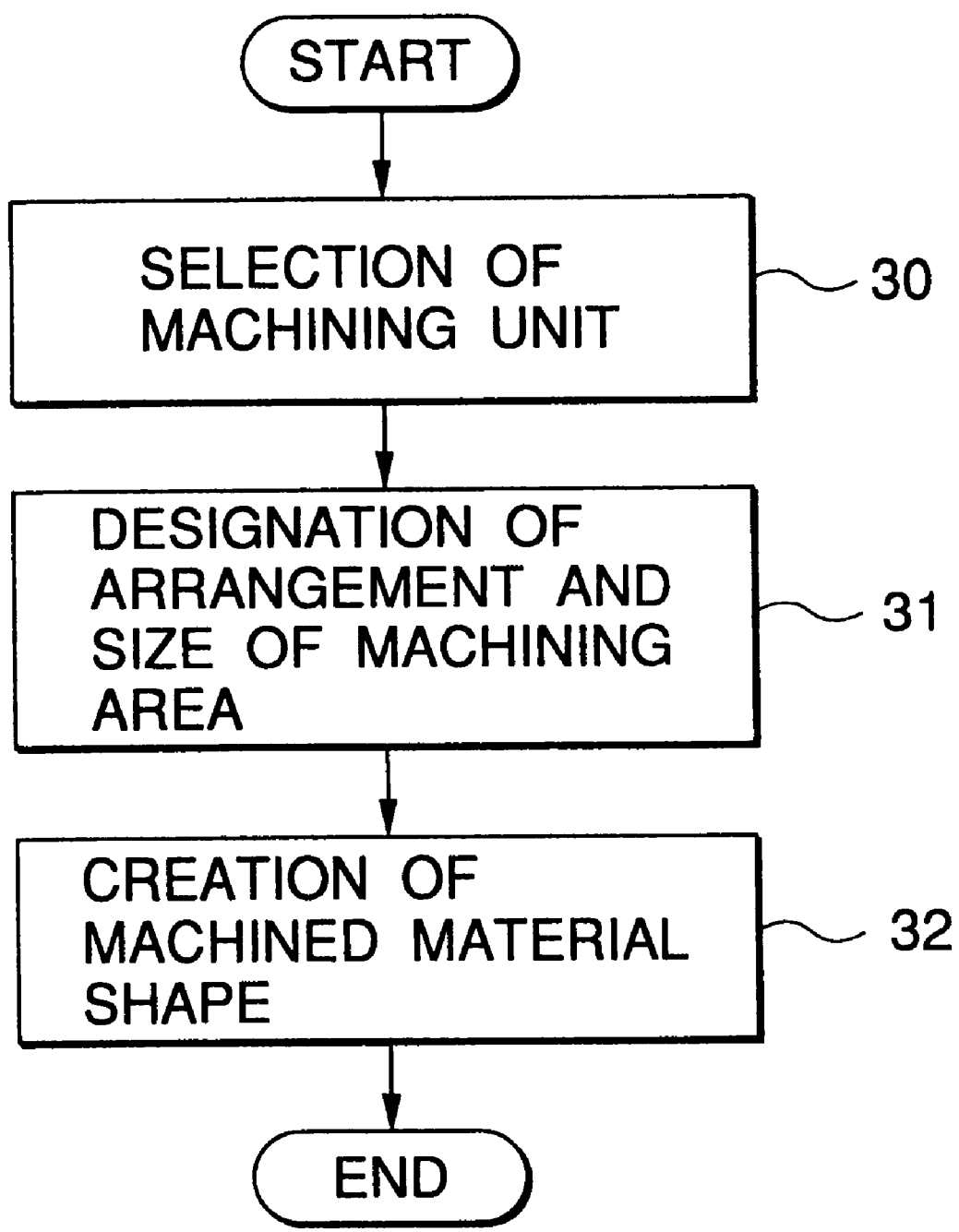

AUTOMATIC PROGRAMMING APPARATUS AND METHOD

BACKGROUND OF THE INVENTION

The present invention relates to an automatic programming device for controlling an NC machine.

In a conventional automatic programming apparatus, an operator defines partial machining steps by mainly inputting graphic elements and machining attributes two-dimensionally (e.g. defining pocket machining by a two-dimensional graphic contour graphic and machining depth) using languages such as APT (Automatically Programmed Tools) and EXAPT (Extended Subset APT) or an interactive manner on the basis of a figure, and gives the order of defined partial machining steps to create a machining program.

Several techniques have been known in which in order to confirm the machining program created, NC data to be supplied to the NC machine are created from a machining program and displayed, and the created NC data are supplied to a machining simulation device to recognize the state of machining.

The above conventional automatic programming apparatus, where the machining from plural directions (e.g. machining of a complicated shape and polygonal machining) is defined, takes a long time to define partial machining two-dimensionally using a graphic element and a machining attribute. In order to test the machining program, a machining simulation must be carried out using the NC data created from the machining program. Thus, checking the machining program requires a long time. Input operations in creating the machining program by trial and error was troublesome.

SUMMARY OF THE INVENTION

The present invention has been accomplished in order to solve the above problem. An object of the present invention is to provide an automatic programming apparatus and a method which can easily create a machining program for a complicate machining and also swiftly create a correct program by trial and error.

The automatic programming apparatus comprises a material shape defining section for defining the material shape represented by a three-dimensional solid model; a machining unit preparing section for preparing plural machining units with unified information of a machining area represented by a three-dimensional solid model and an machining attribute inclusive of a machining method and tool information for machining the machining area; a machining unit defining section for selecting a designated machining unit from the machining units prepared by the machining unit preparing section and designating the arrangement and size of the machining area of the selected machining unit for the material shape defined by the material shaped defining section thereby to define the machining unit for processing; a machined material shape creating section for removing the machining area shape of the machining unit defined by the machining unit defining section from the material shape defined by the material shape defining section through aggregated computation, thereby creating the machining material shape; a machining order setting section for setting a machining order for the machining units defined by the machining unit defining section; and an NC data creating section for creating NC data on the basis of the machining unit with the order set by the machining order setting section.

The plural machining units prepared in the machining unit preparing section are given machining orders by the machining unit defining section and are unified to define a new machining unit, and the new machining unit is prepared as one of the machining units in the machining unit preparing section.

The machining unit defining section can change the arrangement and size of the machining area of the defined machining unit for the material shape, and its machining attribute.

The automatic programming apparatus further comprises a machining simulation section for performing machining simulation on the basis of the NC data for any of machining units defined by the machining unit defining section.

An automatic programming method comprises: a first step of defining the material shape represented by a three-dimensional solid model; a second step of selecting a designated machining unit from plural machining units prepared with unified information of a machining area represented by a three-dimensional solid model and an machining attribute inclusive of a machining method and tool information for machining the machining area and designating the arrangement and size of the machining area of the selected machining unit for the material shape defined by the material shape defining section thereby to define the machining unit for processing; a third step of removing the machining area shape of the machining unit from the material shape through aggregated computation, thereby creating the after-machining material shape; a fourth step of setting a machining order for the defined machining unit; and a fifth step of creating NC data on the basis of the machining unit with the order set; and a sixth step of performing machining simulation on the basis of the NC data for any of the defined machining units. In the second step, the machining unit can be added or canceled, and the machining area and machining attribute of the defined machining unit can be changed.

BRIEF DESCRIPTION OF THE DRAWINGS

FIGS. 2A and 2B are views for explaining the data structure of a machining unit in an automatic programming apparatus in FIG. 1;

FIGS. 3A and 3B are views for explaining an example of the machining unit in the automatic programming apparatus in FIG. 1;

FIG. 8 is a flowchart of processing of changing a machining area in the flowchart of FIG. 4;

DETAILED DESCRIPTION OF THE PREFERRED EMBODIMENTS

Figure 1:
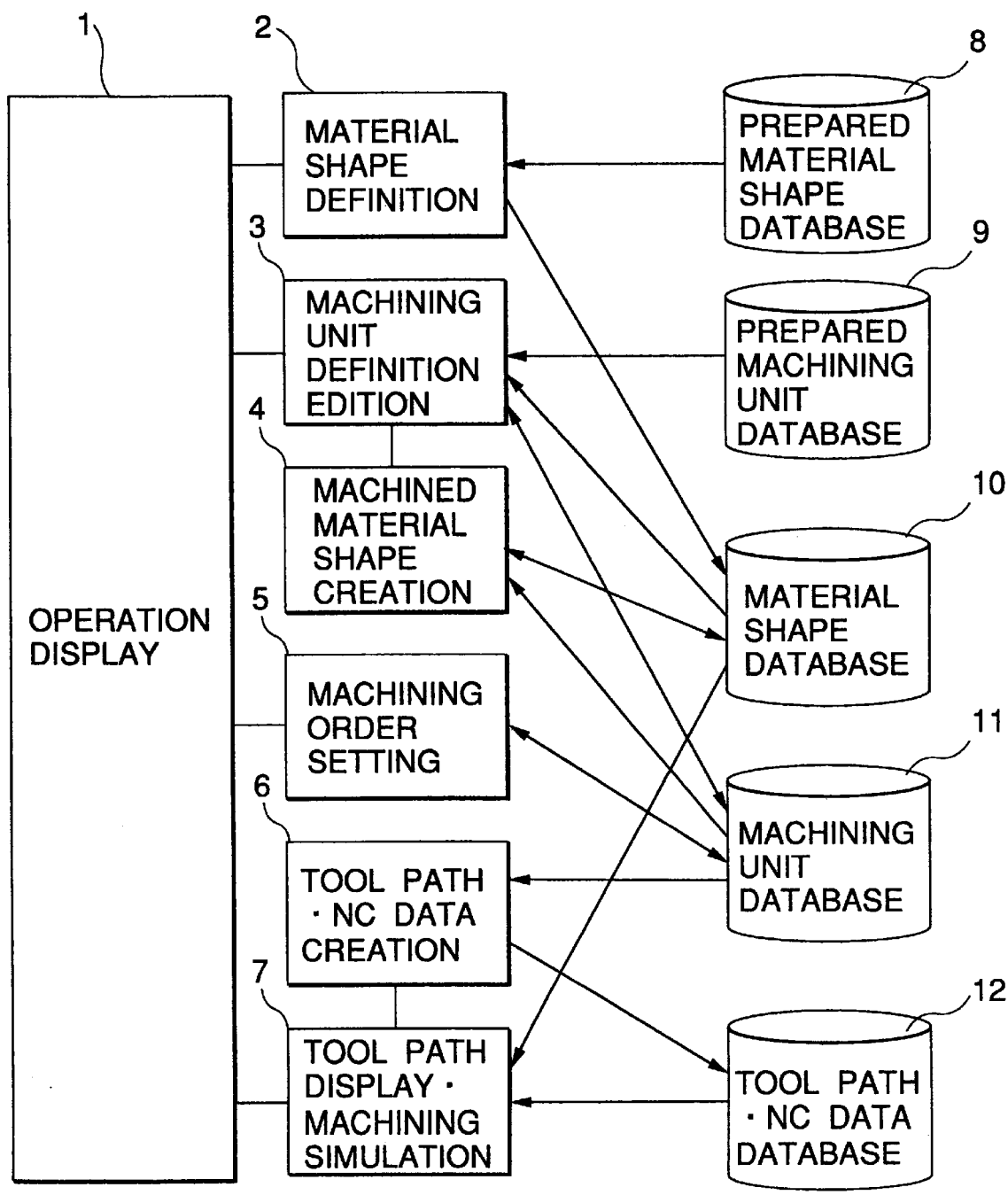
FIG. 1 is a block diagram showing the configuration of an automatic programming apparatus in accordance with a first embodiment of the present invention.

FIG. 1 is a block diagram showing the structure of an automatic programming apparatus in accordance with an embodiment of the present invention. In FIG. 1, reference numeral 1 denotes an operation/display section for transmitting an input received from an operator to each function portion and displaying an output from each functional portion on a screen. Reference numeral 8 denotes a prepared material shape database for storing several material shapes represented by three-dimensional solid models prepared in advance. Reference numeral 2 denotes a material shape defining section for taking out the material shape data designated by the operator from the prepared material shape data, defining the shape transformed into a size designated by the operator and storing the defined shape data in the material shape database 10. Reference numeral 9 denotes a prepared machining unit database serving as a machining unit preparing section for previously storing several machining units composed of unified information of machining attributes such as a machining area represented by a three-dimensional solid model, a machining method and a tool information for machining the machining area.

FIGS. 2A and 2B show a structure of a machining unit. FIG. 2A shows the data structure of its contents. The machining unit is roughly classified into two items of information of a machining area and a machining attribute. The machining area is shape data of a three dimensional solid model which represents the area to be removed of the defined machining unit. The machining attribute is attribute information on the machining such as kind of machining of hole machining, groove machining, pocket machining, etc., finish margin and using tool.

FIGS. 3A and 3B show examples of the machining unit. FIG. 3A shows the unit of spot-facing hole and FIG. 3B shows the unit of pocket machining.

In FIG. 1, reference numeral 3 denotes a machining unit defining/editing section serving as a machining unit defining section for selectively taking out the machining unit designated by an operator from the prepared machining unit database 9, modifying the machining area shape of the machining unit into the arrangement and size designated by the operator on the basis of the material shapes in the material shape database 10 and storing it in the machining unit database 11 as an actual machining unit. The machining unit defining/editing section 3 can cancel the machining unit stored in the machining unit database, change the arrangement and size of the machining area and the machining attribute.

As shown in FIG. 2B, several machining units can be unified into a single machining unit. Specifically, a plurality of machining units prepared on the prepared machining unit database 9 are designated the order of machining by the machining unit defining/editing section 3 from the operator so that they are defined into a new unified machining unit. The new machining unit is prepared as one of the machining units in the prepared machining unit database 9.

In FIG. 1, reference numeral 4 denotes a machined material shape creating section for creating a machined material shape obtained by removing the machining area shapes of all the machining units stored in the machining unit database 11 from the material shapes stored in the material shape database 10 through Boolean operation and storing them as the machined material shape in the material shape database 10. Reference numeral 5 denotes a machining order setting unit for setting the storing order of the machining units stored in the machining unit database 11, which has been changed by operator's designation. The machining will be carried out in accordance with the storing order.

Reference numeral 6 denotes a tool-path/NC-data creating section serving as an NC data creating section which takes the machining units in order from the machining unit database 11 in accordance with a requirement from the tool path display/machining simulation section 7 described below, creates the machining tool and NC data on the basis of the machining units thus taken and stores the data thus created in the tool-path/NC-data database 12. Reference numeral 7 denotes a tool-path-display/machining-simulation section serving as a machining simulation section serving as a machining simulation section which takes out the tool path and NC data from the tool-path/NC-data database 12 to display the tool path taken and the process of machining simulation based on the NC data taken out.

An operation will be given of the operation of the automatic programming method according to the present invention.

Figure 4:
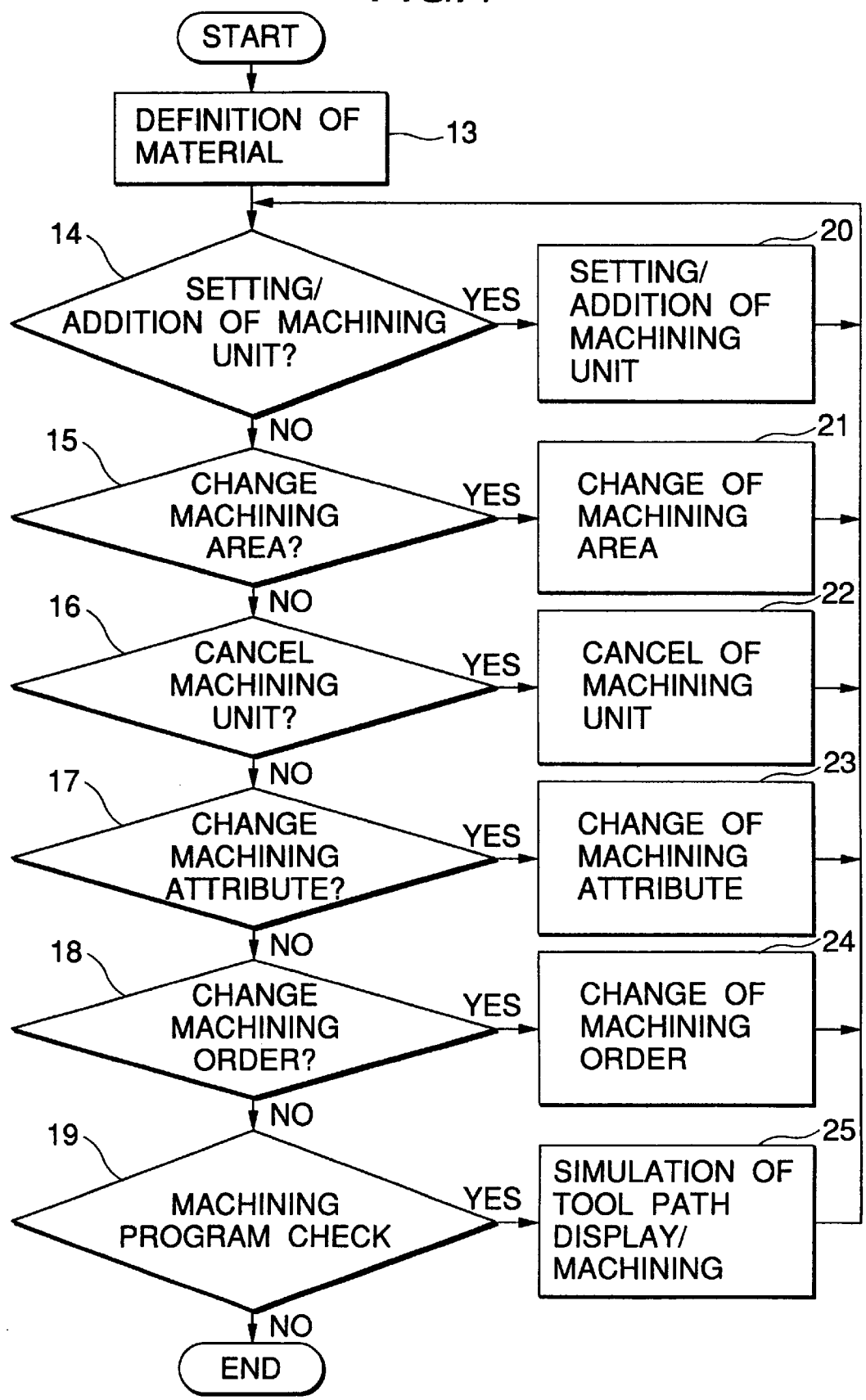
FIG. 4 is a flowchart of creating a machining program in an automatic programming apparatus in FIG. 1.

FIG. 4 shows a flow of creating the machining unit which is a machining program in the automatic programming apparatus shown in FIG. 1. In step 13, the material shape of a three-dimensional solid model is defined which is a base when the machining area of the machining unit is defined by the material shape defining section 2. In step 14, decision is made on whether or not a machining unit should be newly set or added. If "YES", in step 20, processing of setting/adding the new machining unit is carried out by the machining unit defining/editing section. Such a process is repeated to set a necessary number of machining units.

Figure 5:
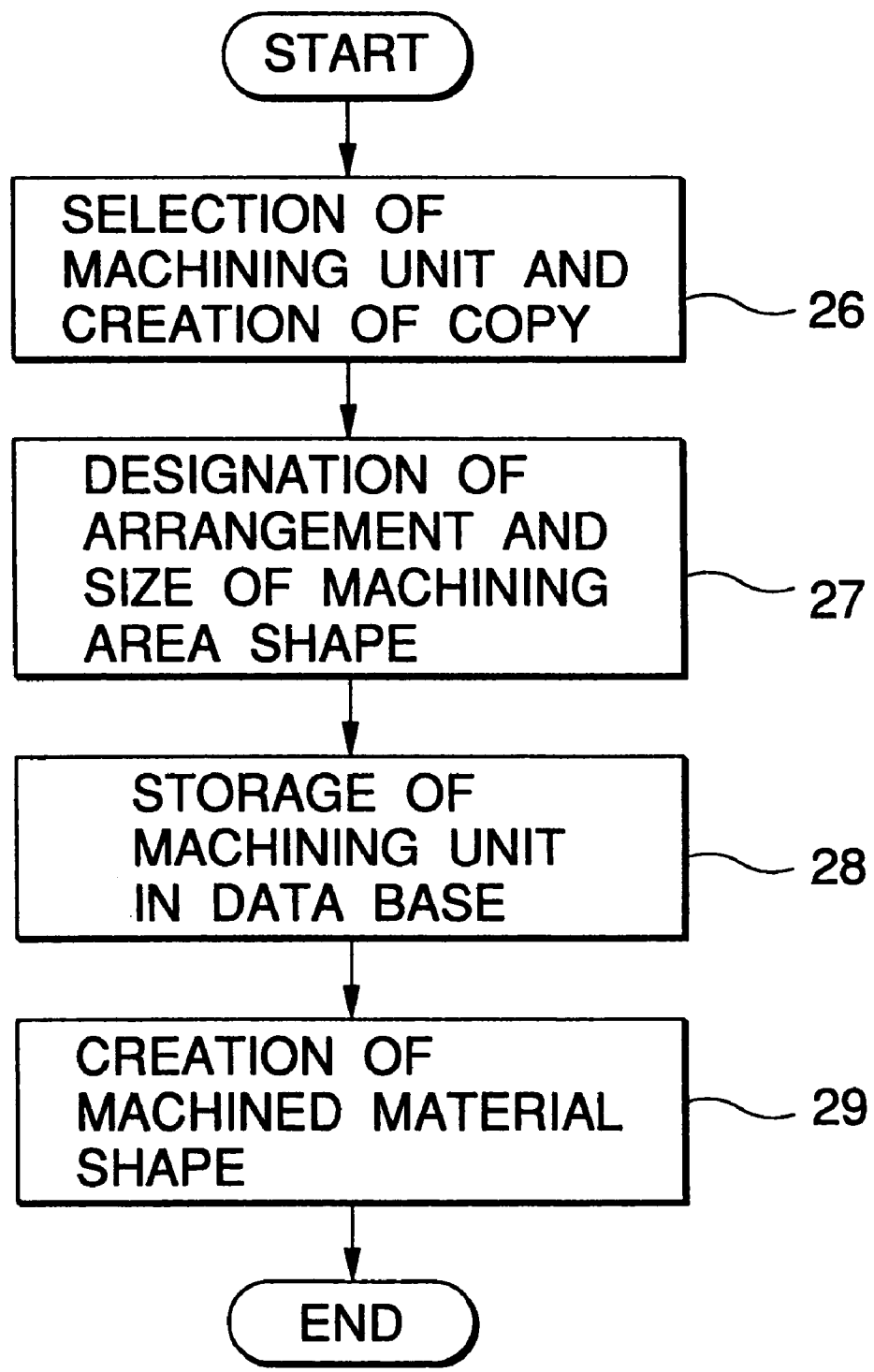
FIG. 5 is a flowchart of processing of setting/adding a machining unit in FIG. 4.
Figure 6A:
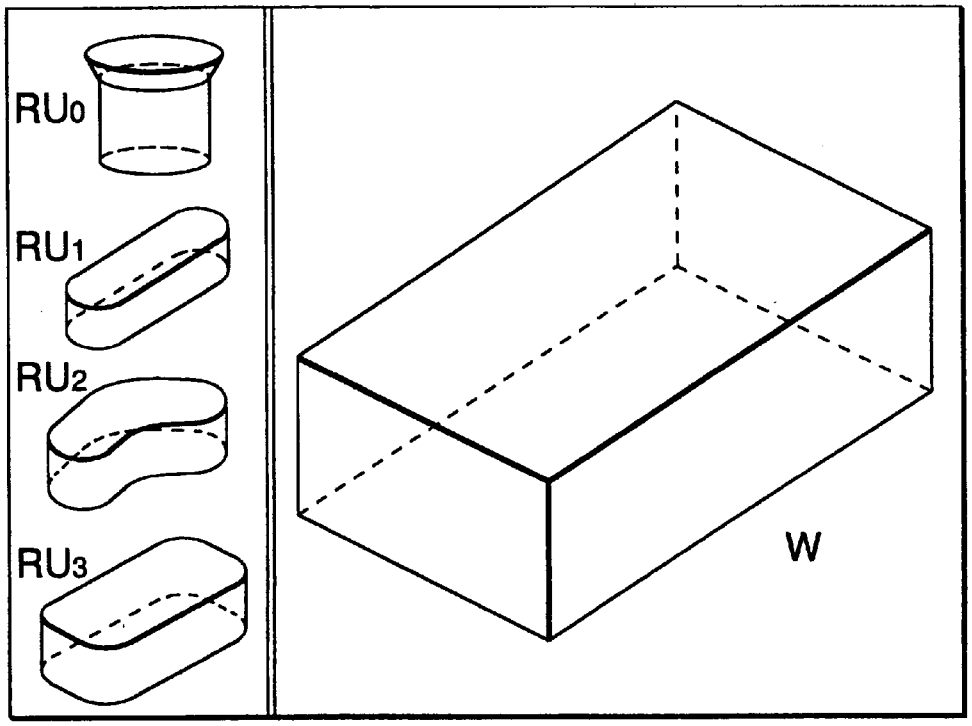
FIGS. 6A and 6B are image views showing examples of the processing of setting/adding a machining unit in the flow of FIG. 4.
Figure 6B:
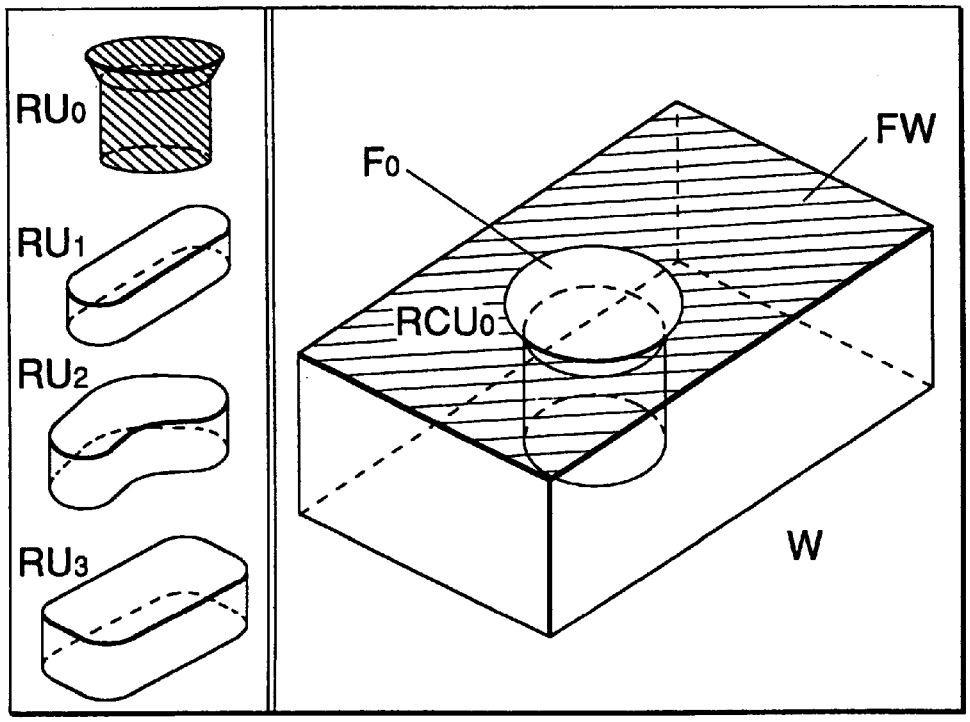

FIG. 5 shows the flow of processing of machining unit setting/adding. In step 26, the machining unit designated by the operator is selected from the machining units prepared beforehand to create the machining unit (machining area and machining attribute). In step 27, the arrangement and size of the machining area shape included in the machining unit thus created are designated on the basis of the material shape. FIG. 6 shows an example of this step on the screen of the automatic programming apparatus. Reference symbols $RU_0$ to $RU_3$ represent machining areas of machining units $U_0$ to $U_3$ (not shown) and reference symbol W represents a material shape. FIG. 6A shows the state where the material shape W is defined. FIG. 6B shows the state where the machining unit $U_0$ is selected and the arrangement and size of the machining area $RCU_0$ of its copy $CU_0$ (not shown) for the material shape W are designated. The arrangement of $RCU_0$ is designated so that the face $F_0$ of the machining area $RCU_0$ overlaps the face FW of the material shape W.

Figure 7A:
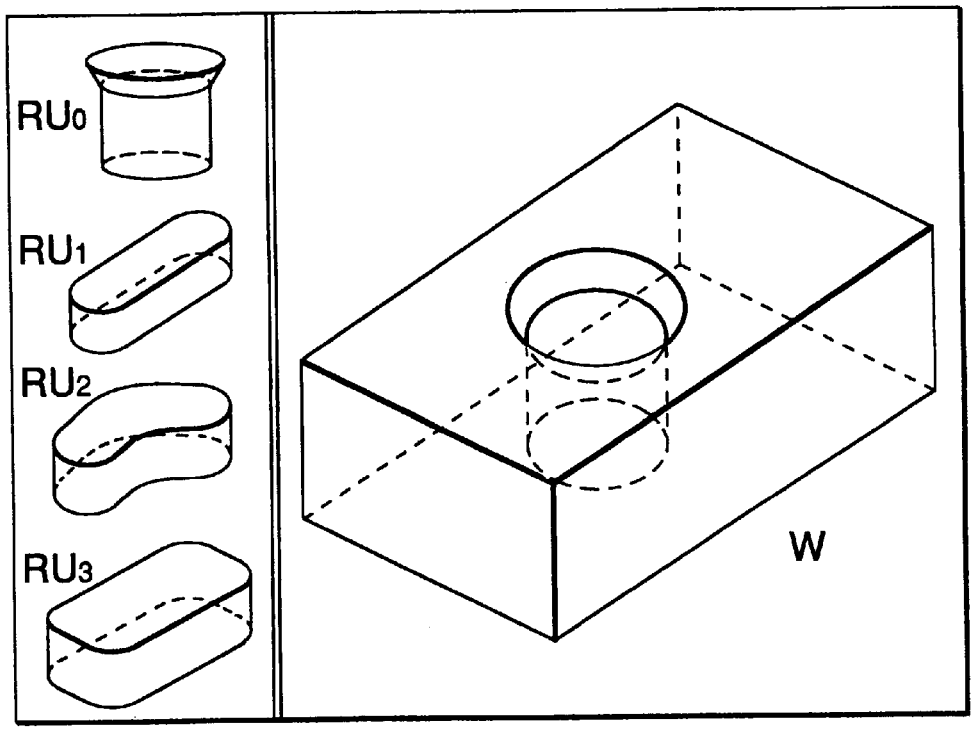
FIGS. 7A and 7B are image views showing examples of the processing of setting/adding a machining unit in the flow of FIG. 4.
Figure 7B:
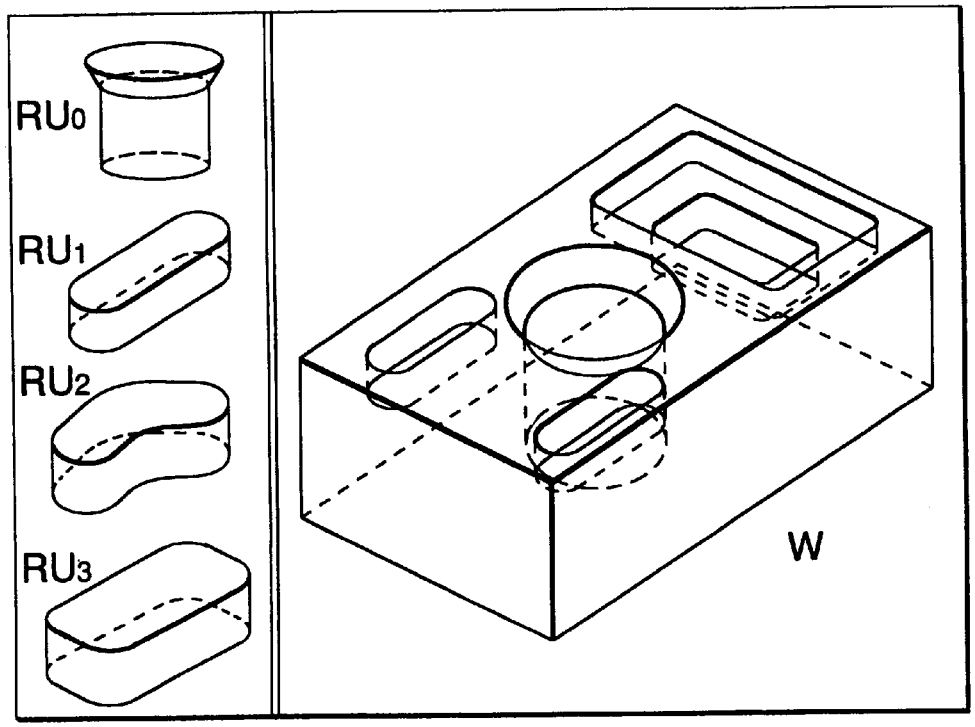

In step 28 of FIG. 5, the machining unit defined by designating the arrangement and size of the machining area is stored in the machining unit database 11. In step 29, the machined material shape is created by removing the machining area shapes of all the machining units stored in the machining unit database 11 from the material shape through Boolean operation by the machined material shape creating creating section 4 and is stored in the material shape database 10. FIGS. 7A and 7B show examples of the screen of the automatic programming device when the machined material shape has been created. FIG. 7A shows the state where the machining area $RCU_0$ of which the arrangement and size are designated for the material shape W has been removed from the material shape W, and FIG. 7B shows the state where four machining areas have been removed from the material shape W. The above is the machining unit setting/adding processing of step 20.

Figure 9A:
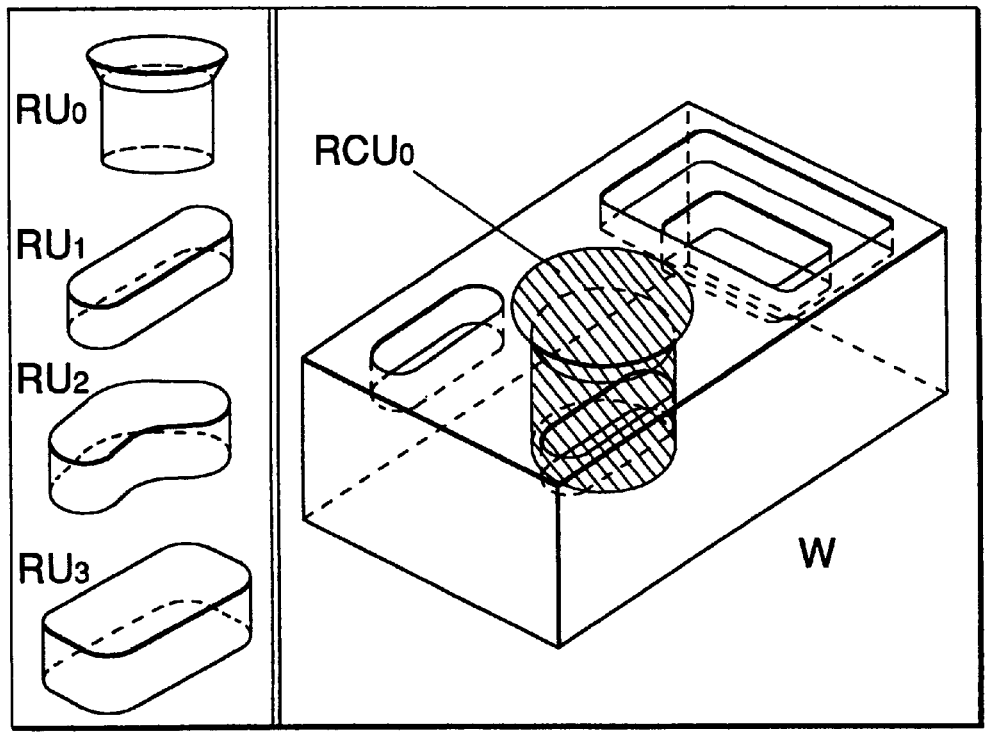
FIGS. 9A and 9B are views showing examples of the processing of changing a machining area in the flowchart of FIG. 4.
Figure 9B:
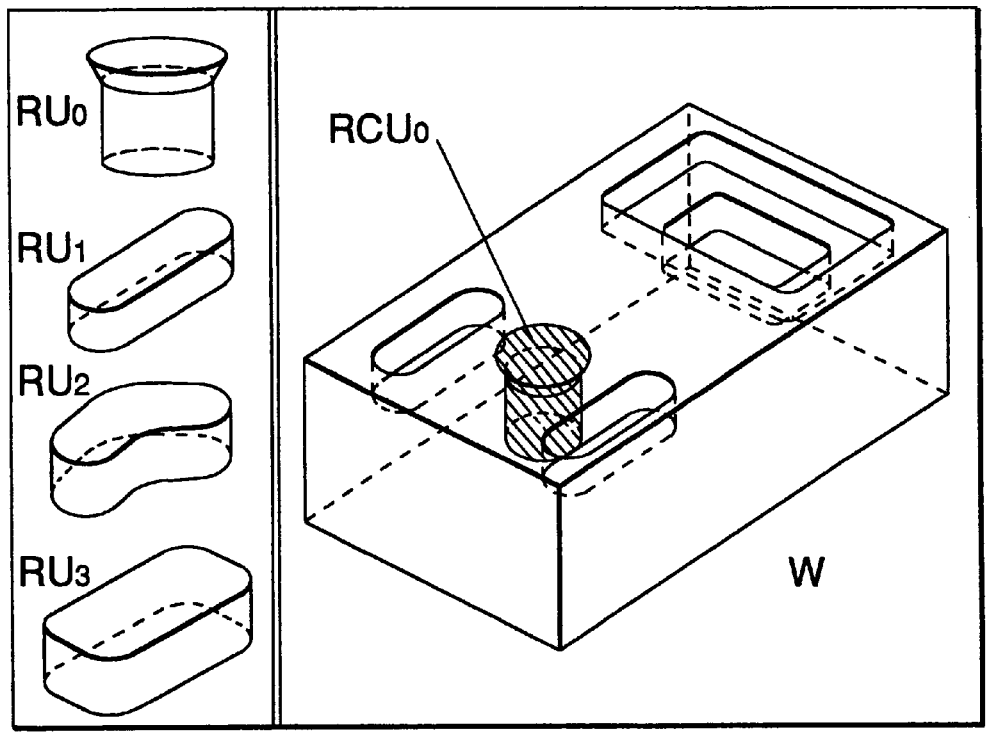
Figure 10:
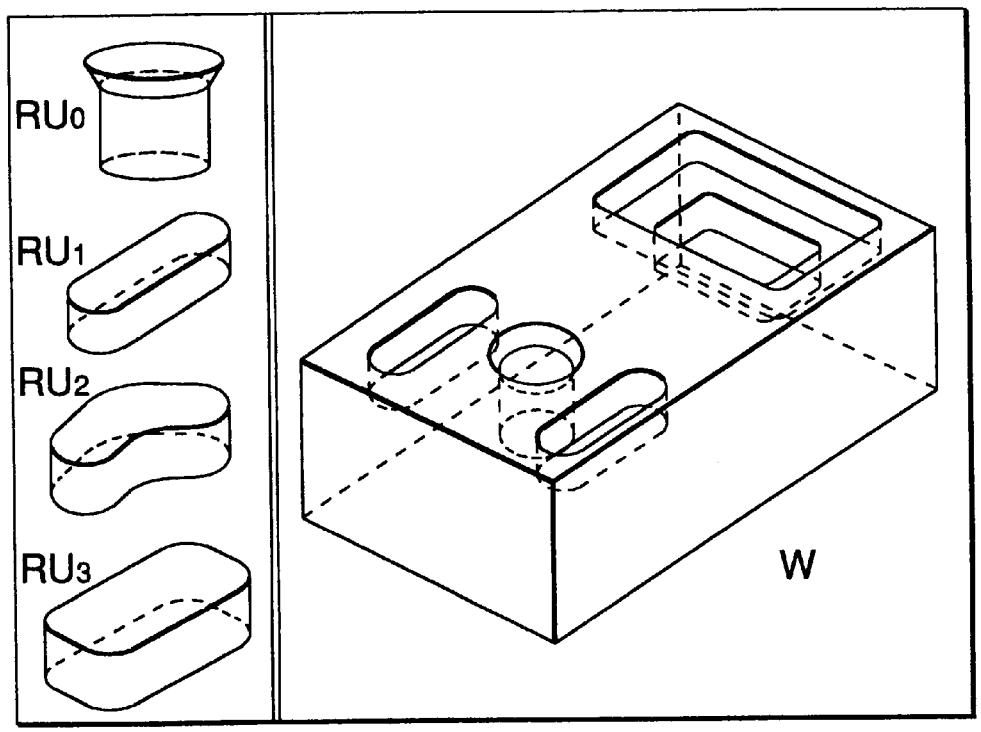
FIG. 10 is a view showing an example of the processing of changing a machining area in the flowchart of FIG. 4.

In step 15 of FIG. 4, decision is made on whether or not the arrangement and size of the machining area included in the machining unit stored in the machining unit database 11 should be changed. If "YES", in step 21, processing of machining area changing is performed. The flow of the processing of machining area changing in step 21 is shown in FIG. 8. In step 30, the machining unit in which changing its machining area has been designated is selected from the machining units stored in the machining unit database 11. FIG. 9A shows this example in which $RCU_0$ denotes a machining area of a selected machining unit $CU_0$ (not shown). In step 31, the arrangement and size of the machining area of the selected machining unit is changed by an instruction of the operator. FIG. 9B shows the state where the arrangement and size of the machining area $RCU_0$ of the selected machining unit $CU_0$ has been changed. In step 32 of FIG. 8, like step 29, the machined material shape is created according to changing of the machining area is created and stored. FIG. 10 shows the state where the machined material shape has been created after changing of the machining area is designated. The above is the machining area changing processing.

Figure 11:
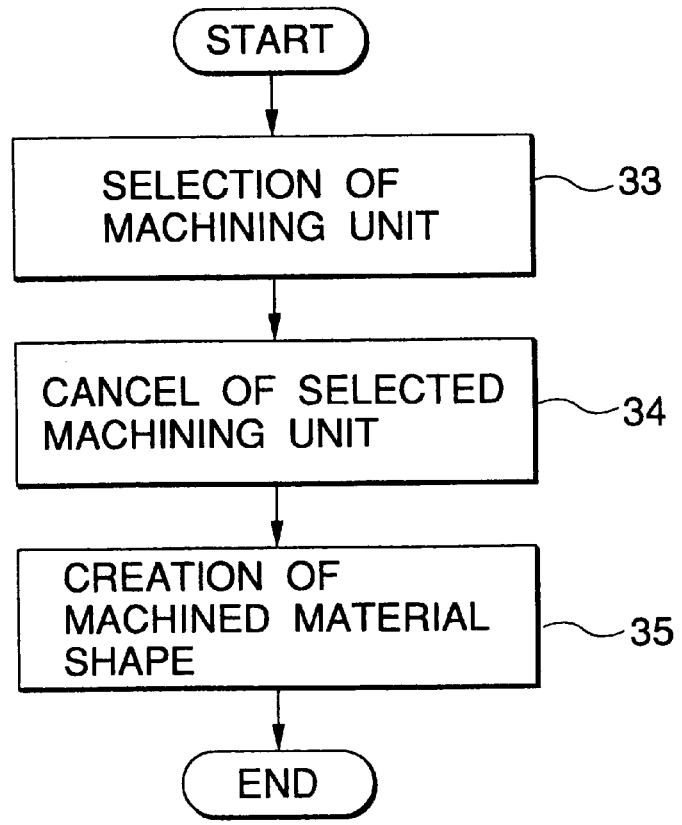
FIG. 11 is a flowchart of processing of canceling a machining unit in the flowchart of FIG. 4.
Figure 12A:
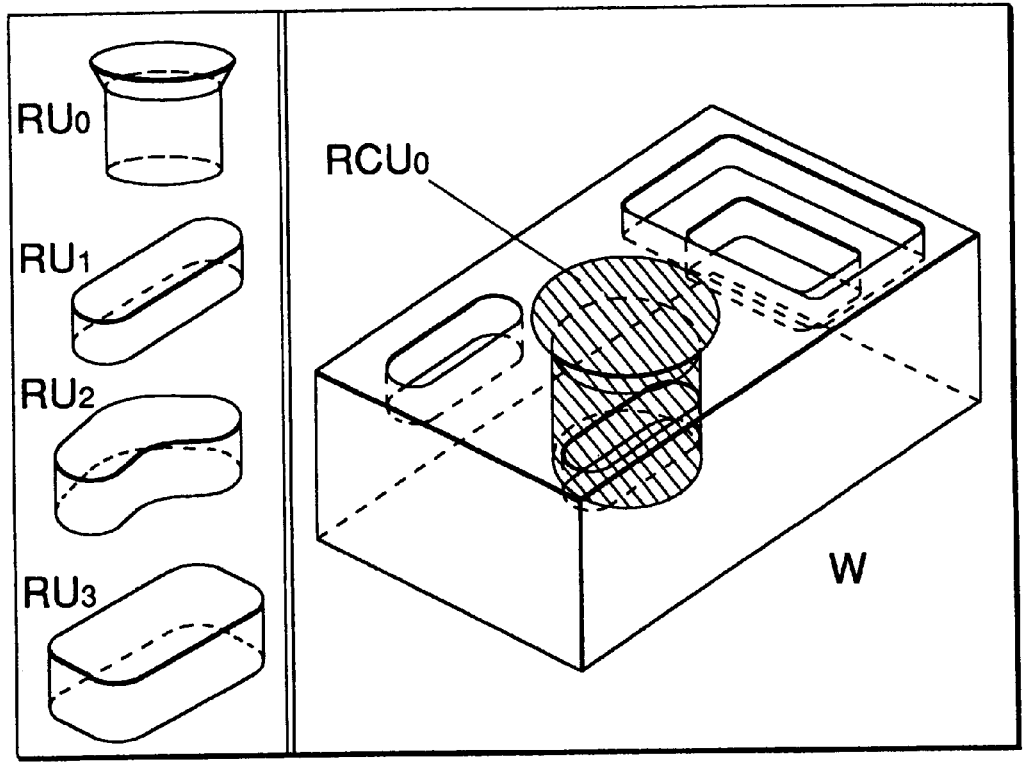
FIGS. 12A and 12B are image views showing examples of processing of canceling a machining unit.
Figure 12B:
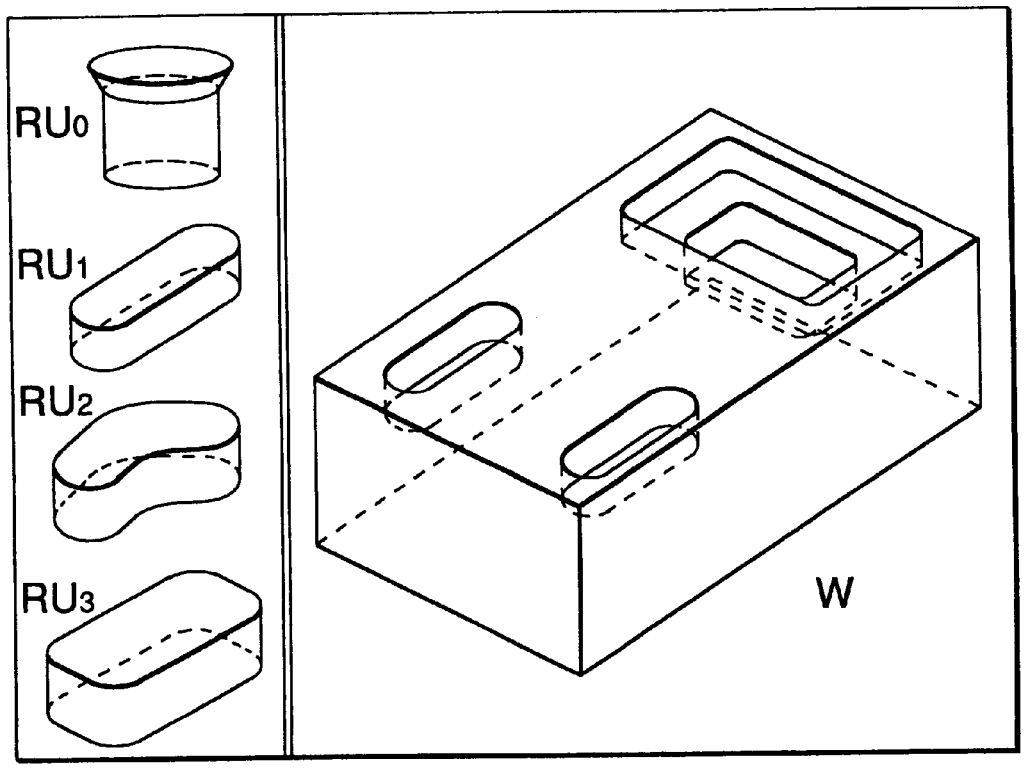

In step 16, decision is made on whether or not the machining unit stored in the machining unit database 11 should be canceled. If "YES", in step 22, processing of machining unit canceling is performed by the machining unit defining/editing section 3. The flow of the machining unit canceling processing is shown in FIG. 11. In step 33, the machining unit to be canceled from the machining unit database 11 is selected by the operator. In step 34, the selected machining unit is canceled form the machining unit database 11. In step 35, according to changing of the machining unit, like step 29, the machined material shape is created and stored. FIG. 12A shows the state where machining unit $CU_0$ (not shown) having the machining area $RCU_0$ has been selected. FIG. 12B shows the state of the machined material shape with the machining unit $CU_0$ canceled. The above is the machining unit canceling processing.

Figure 13:
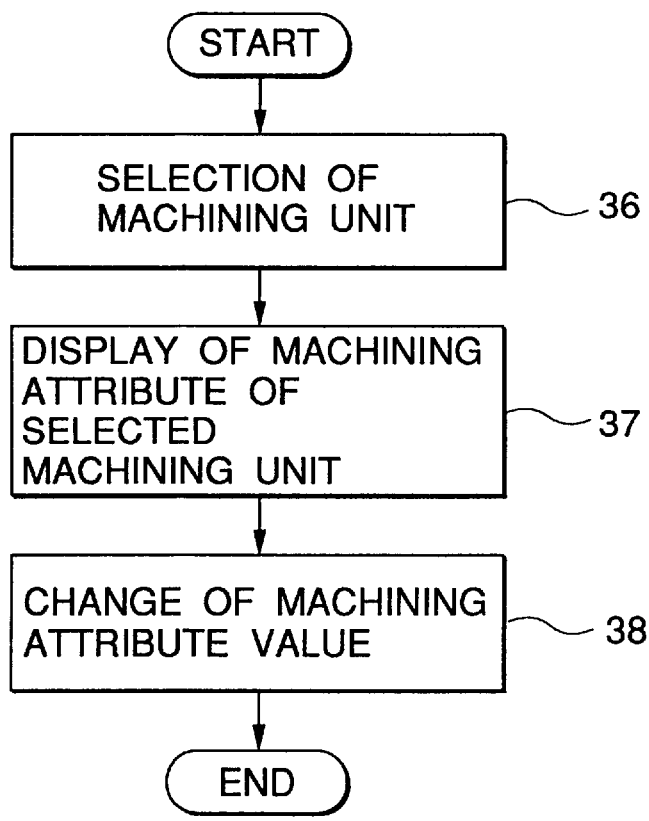
FIG. 13 is a flowchart of processing of changing a machining attribute in the flowchart of FIG. 4.
Figure 14:
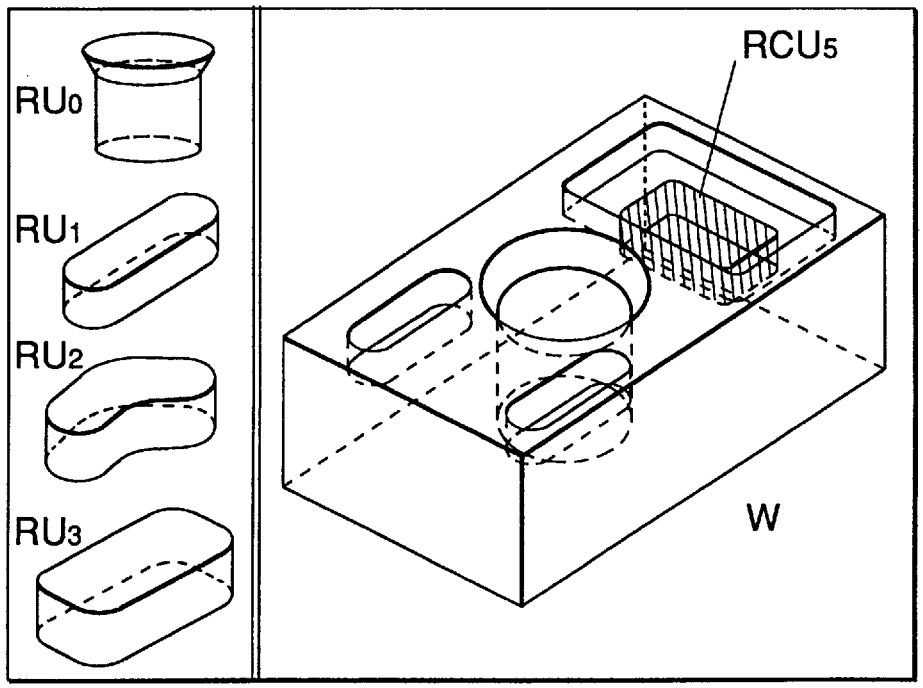
FIG. 14 is an image view showing an example of processing of changing a machining attribute in the flowchart of FIG. 4.
Figure 15A:
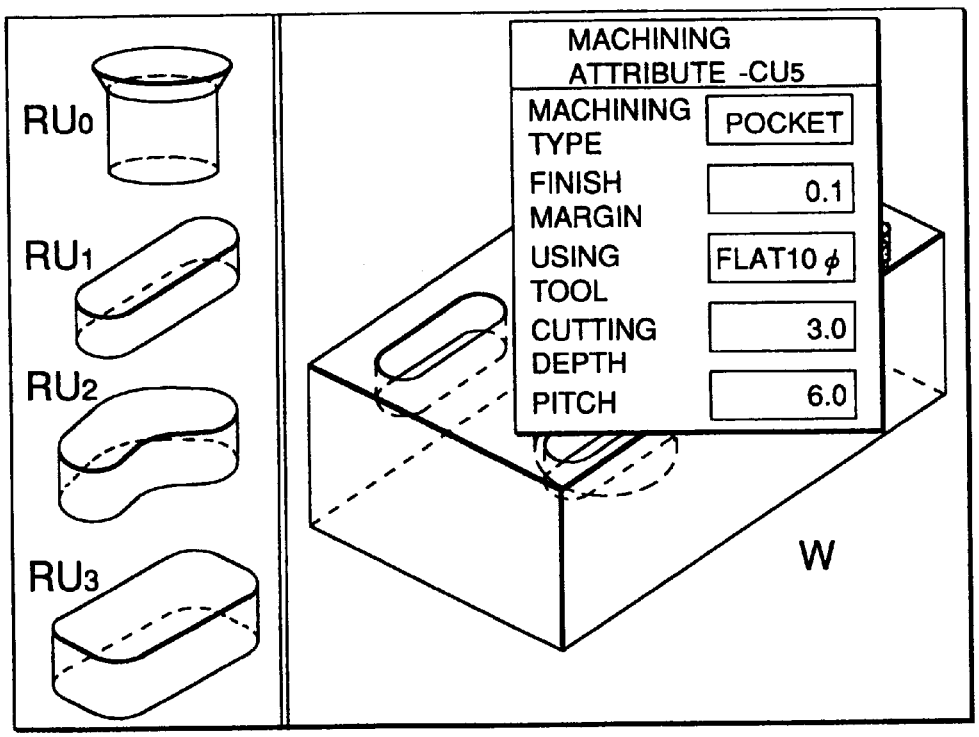
FIGS. 15A and 15B are image views showing examples of processing of changing a machining attribute in the flowchart of FIG. 4.
Figure 15B:
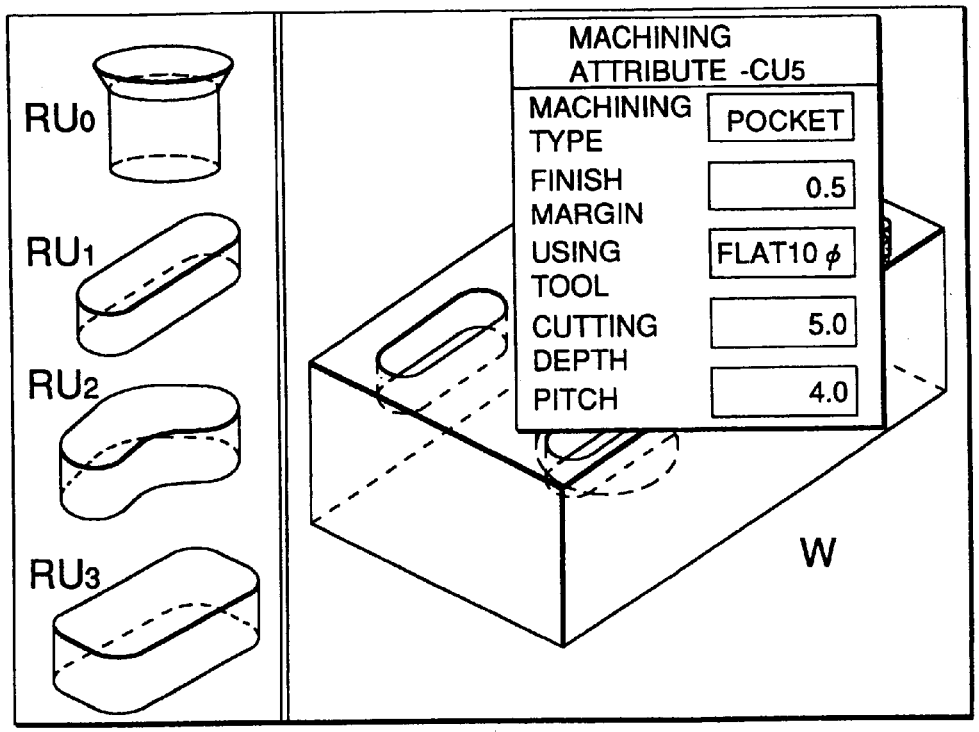

In step 17 of FIG. 4, decision is made on whether or not the machining attribute of the machining unit stored in the machining unit database 11 should be changed. If "YES", in step 23, processing of changing the machining attribute is performed by the machining unit defining/editing section 3. The flow of the machining attribute changing processing is shown in FIG. 13. In step 36 of FIG. 13, the machining unit designated by the operator is selected from the machining units stored in the machining unit database 11. In step 37, the machining attribute of the selected machining unit is displayed to exhibit the present set value for the operator. In step 38, the item of the machining attribute designated by the operator is changed by an instruction from the operator. FIGS. 14, 15A and 15B show an example of processing of changing the machining attribute. FIG. 14 shows the state where the machining unit $CU_5$ with the machining attribute to be changed has been selected. FIG. 15A shows the state where the setting values of the present machining attribute of the selected machining unit are displayed. FIG. 15B shows the state where the setting values of the machining attribute have been changed from the state of FIG. 15A. The above is the machining attribute changing processing of step 23.

In step 18 of FIG. 4, decision is made on whether or not the storing order of the machining units stored in the machining unit database 11 should be changed. If "YES", in step 24, processing of changing the machining order is performed by the machining order setting section 5. The storing order of the machining units in the machining unit database 11 means the order of the machining units which is a base of creating the tool path and NC data and also means the order of machining. In the machining order changing processing of step 24, the order of the machining units the order of which should be changed is changed and set.

Figure 16:
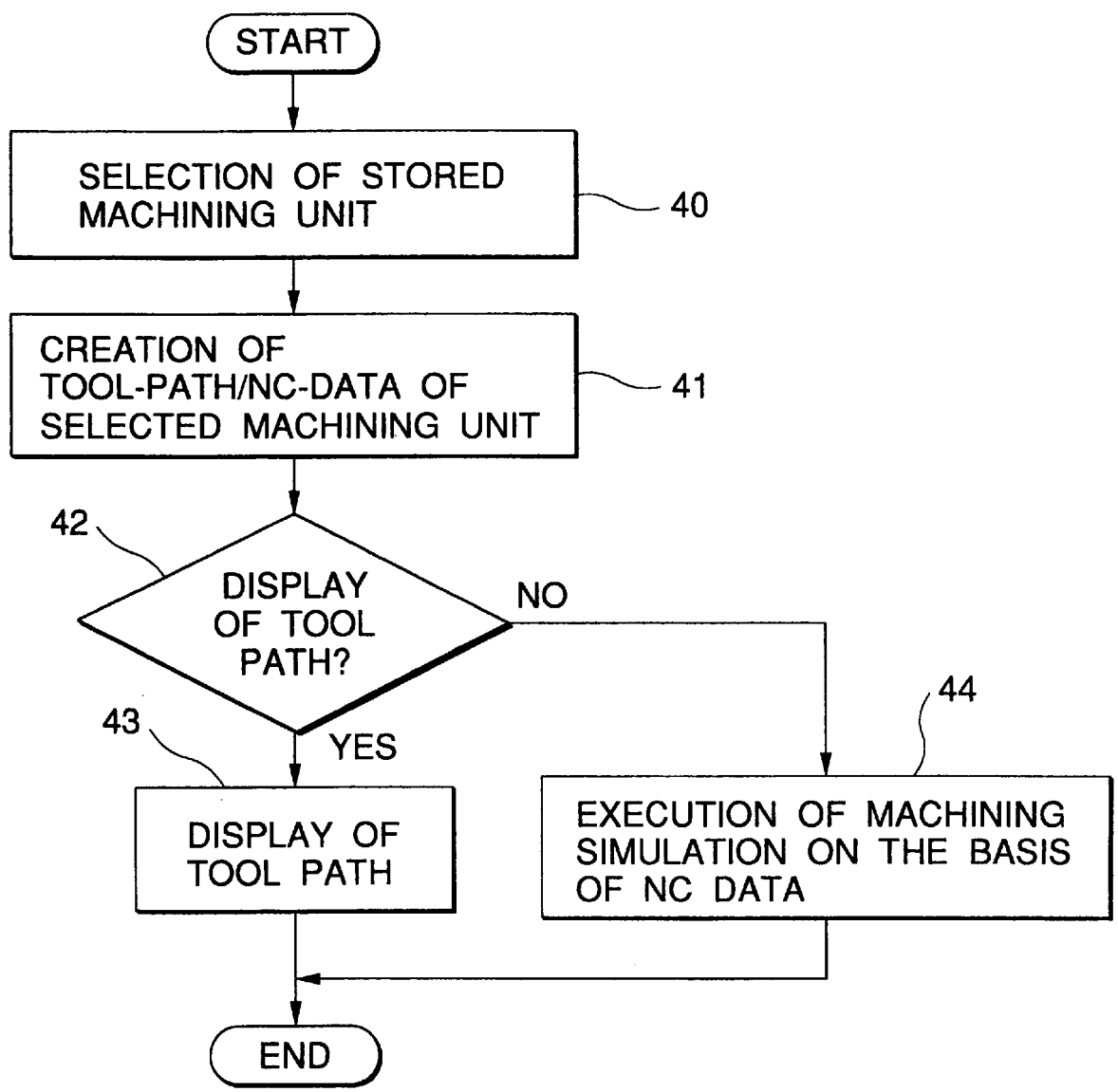
FIG. 16 is a flowchart showing an example of processing of tool path display and machining simulation in the flow of FIG. 4.

In step 19 of FIG. 4, decision is made on whether or not the machining units stored in the machining unit database 11, i.e. the machining program should be checked. If "YES", in step 25, processing of displaying the tool path and machining simulation is performed. The flow of the machining simulation of step 25 is shown in FIG. 16. In step 40 of FIG. 16, the machining units to be checked are selected from the machining unit database 11 by the operator. In step 41, the selected machining units are taken out in the earlier storing order in the machining unit database 11. The tool path and NC data are created from the machining units by the tool-path/NC data creasing section 6.

Figure 17A:
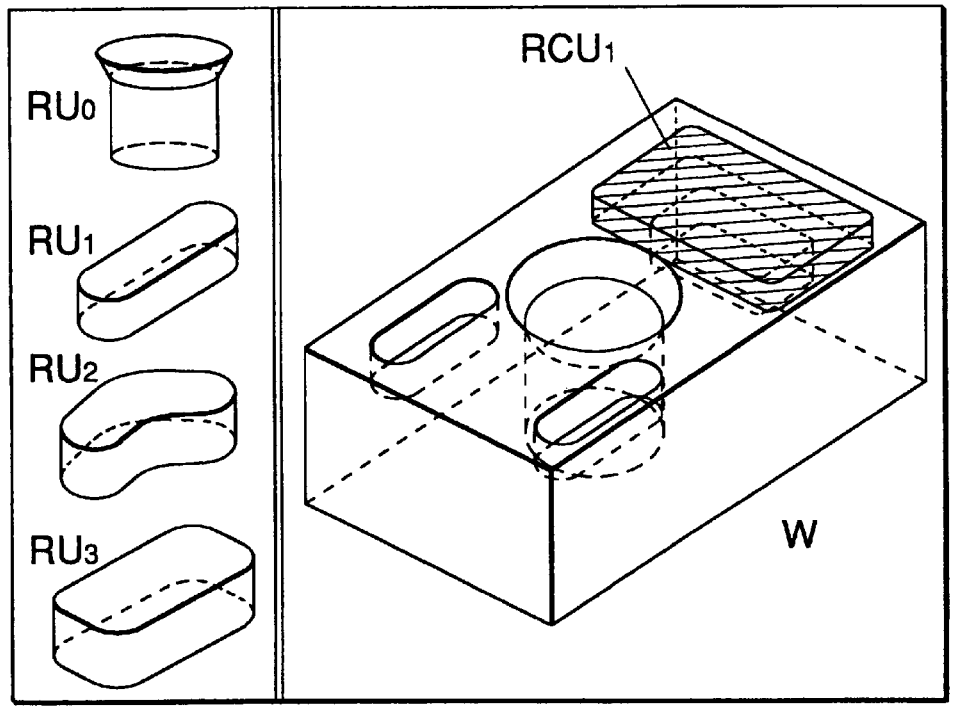
FIGS. 17A and 17B are views showing examples of processing of tool path display and machining simulation in the flow of FIG. 4.
Figure 17B:
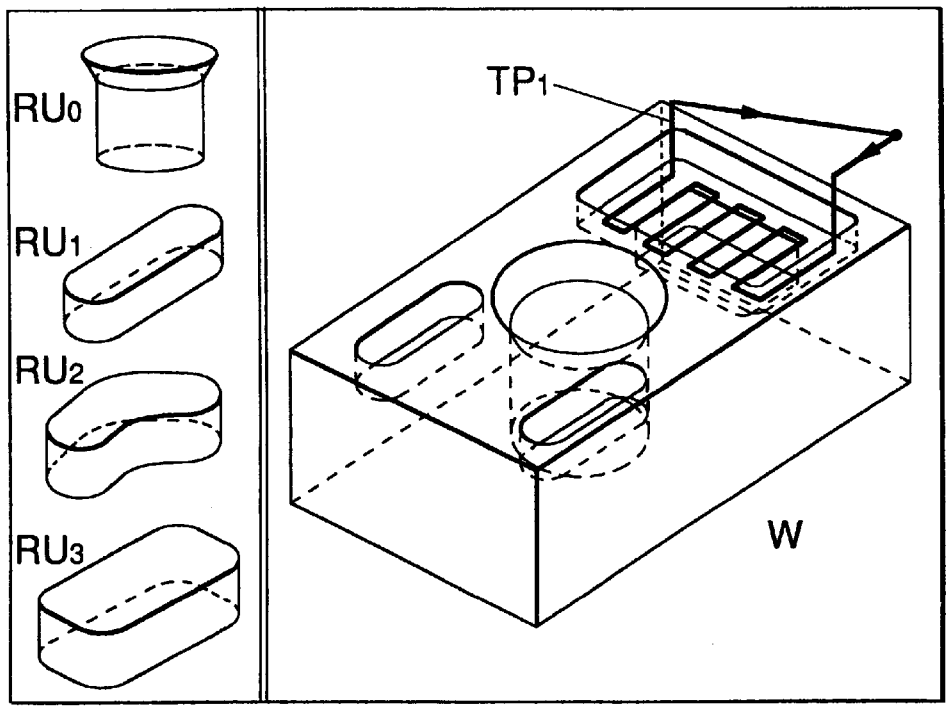
Figure 18:
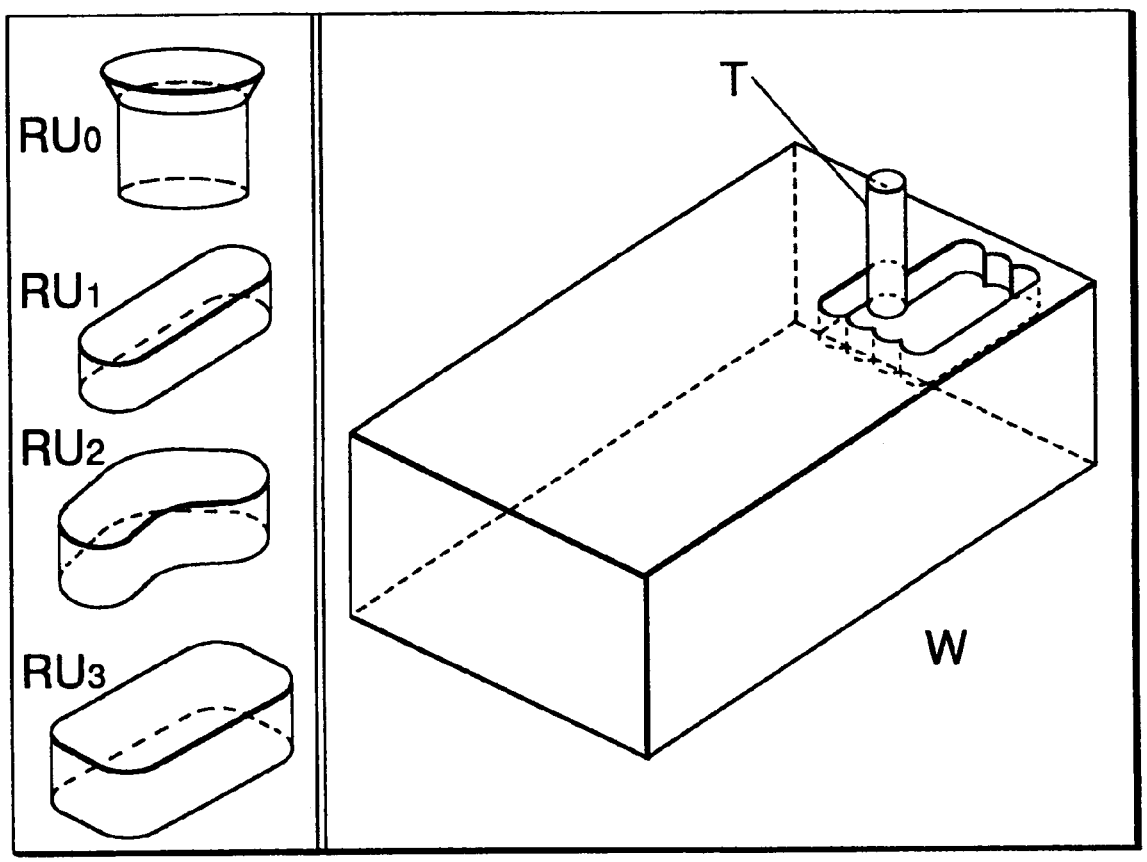
FIG. 18 is an image view showing an example of processing of tool path display and machining simulation.

In step 42, decision is made on whether or not the tool path should be displayed. If "YES", in step 43, the tool path is displayed by the tool-path-display/machining simulation section 7. If "NO", in step 44, the machining simulation is performed using the NC data as a base and displayed. FIGS. 17 and 18 show an example of processing of tool path display and machining simulation. FIG. 17A shows the state where the selected machining unit $CU_4$ (not shown) has been selected. FIG. 17B shows the state where the tool path $TP_4$ created for the selected machining unit $CU_4$ is displayed. FIG. 18 shows the state where the machining simulation is performed on the basis of the NC data for the selected machining unit $CU_4$ and displayed. The operator refers to the tool path and the machining simulation result as shown in FIGS. 17B and 18, and corrects the machining units if it is inconvenient.

Incidentally, the order of the flow in steps 14 to 18 in FIG. 4 may be changed.

The automatic programming apparatus comprises a machining unit preparing section for preparing plural machining units; a machining unit defining section for selecting a designated machining unit from the prepared machining units and designating the arrangement and size of the machining area of the selected machining unit thereby to define the machining units for processing; a machining order setting section for setting a machining order for the machining unit; and an NC data creating section for creating NC data on the basis of the machining unit with the order set by the machining order setting section. Therefore, partial machining can be defined in such a manner that an operator designates the prepared machining unit and inputs the arrangement and size of the machining area for a material shape and machining attribute information, and the NC data can be created in such a manner that the order of the defined partial machining is designated. The automatic programming apparatus further comprises a machined material creating section for removing the machining area shape from the material shape to create a machined material shape. For this reason, by creating the machined material shape when the partial machining is defined, the input machining data can be checked quickly.

Thus, as compared with the conventional automatic programming apparatus, a machining program can be easily created in complicated machining such as machining of a complicated machined shape and polygonal machining. The correct program can be created quickly by trial and error.

By preparing a new machining unit composed of unified machining units, the efficiency of programming can be improved.

Since the machining area of the machining unit and machining attribute are changed, a desired program can be performed quickly.

Since the automatic programming apparatus has a machining simulation section, the correct program can be easily obtained.

The automatic programming method selects a designated machining unit from plural prepared machining units and designates the arrangement and size of the machining area of the selected machining unit to define the machining units, sets a machining order for the defined machining units and creates NC data on the basis of the machining unit with the order set. Therefore, the machining program can be easily created in complicated machining in such a manner that an operator designates the machining unit, inputs the arrangement and size of the machining area and machining attribute information and set the order of machining. Further, by checking the machined material shape, tool path and machining simulation result, a correct program can be created quickly by trial and error.

What is claimed is:

1. An automatic programming apparatus for creating a program to control an NC machine, comprising:

a material shape defining section for defining the material shape represented by a three-dimensional solid model;

a machining unit preparing section for preparing plural machining units with unified information of a machining area represented by a three-dimensional solid model and an machining attribute inclusive of a machining method and tool information for machining the machining area;

a machining unit defining section for selecting a designated machining unit from the machining units prepared by said machining unit preparing section and designating the arrangement and size of the machining area of the selected machining unit for the material shape defined by said material shaped defining section thereby to define the machining units for processing;

a machined shape material creating section for removing the machining area shape of the machining unit defined by the said machining unit defining section from the material shape defined by said material shape defining section through Boolean operation, thereby creating the machined shape;

a machining order setting section for setting a machining order for the machining units defined by said machining unit defining section; and an NC data creating section for creating NC data on the basis of the machining unit with the order set by said machining order setting section.

2. An automatic programming apparatus as claimed in claim 1, wherein said plural machining units prepared by said machining unit preparing section are given machining orders by said machining unit defining section and are unified to define a new machining unit, and said new machining unit is stored as one of said machining units in said machining unit preparing section.

3. An automatic programming apparatus as claimed in claim 1, wherein said machining unit defining section changes the arrangement and size of the machining area of the defined machining unit for the material shape, and its machining attribute.

4. An automatic programming apparatus as claimed in claim 1, further comprising a machining simulation section for performing machining simulation on the basis of the NC data for any machining unit defined by said machining unit defining section.

5. An automatic programming method for creating a program for controlling an NC machine, comprising the steps of:

a first step of defining the material shape represented by a three-dimensional solid model;

a second step of selecting a designated machining unit from plural machining units prepared with unified information of a machining area represented by a three-dimensional solid model and an machining attribute inclusive of a machining method and tool information for machining the machining area and designating the arrangement and size of the machining area of the selected machining unit for the material shape defined by said material shape defining section thereby to define the machining units for processing;

a third step of removing the machining area shape of said machining unit from said material shape through Boolean operation, thereby creating the machined material shape;

a fourth step of setting a machining order for said defined machining units; and a fifth step of creating NC data on the basis of the machining units with the order set; and a sixth step of performing machining simulation on the basis of the NC data for any of said machining units, wherein in said second step, said machining unit is added or canceled, and the machining area and machining attribute of said defined machining unit is changed.

* * * * *